(12) United States Patent
Bruhn et al.

(10) Patent No.: US 11,146,605 B2
(45) Date of Patent: Oct. 12, 2021

(54) DISTRIBUTED DATA TRANSMISSION FOR INTERNET OF THINGS DEVICES

(71) Applicant: DISH Network L.L.C., Englewood, CO (US)

(72) Inventors: Christopher Bruhn, Aurora, CO (US); Adam Morzos, Franktown, CO (US)

(73) Assignee: DISH NETWORK L.L.C., Englewood, CO (US)

(*) Notice: Subject to any disclaimer, the term of this patent is extended or adjusted under 35 U.S.C. 154(b) by 0 days.

(21) Appl. No.: 16/748,531

(22) Filed: Jan. 21, 2020

(65) Prior Publication Data

US 2021/0227015 A1 Jul. 22, 2021

(51) Int. Cl.
| | | |
|---|---|---|
| *H04L 29/06* | (2006.01) | |
| *H04L 29/08* | (2006.01) | |
| *H04W 4/70* | (2018.01) | |
| *H04W 40/24* | (2009.01) | |
| *H04W 40/12* | (2009.01) | |
| *H04W 28/06* | (2009.01) | |
| *G06F 21/64* | (2013.01) | |

(52) U.S. Cl.
CPC .......... *H04L 65/4092* (2013.01); *G06F 21/64* (2013.01); *H04L 67/04* (2013.01); *H04L 67/06* (2013.01); *H04L 67/12* (2013.01); *H04W 4/70* (2018.02); *H04W 28/06* (2013.01); *H04W 40/12* (2013.01); *H04W 40/246* (2013.01)

(58) Field of Classification Search
CPC . H04L 65/4084; H04L 65/80; H04L 65/4069; H04L 67/06; H04L 67/12; H04L 47/34; H04L 9/0625; H04L 9/085; H04L 9/3234; H04L 65/4092; G06F 21/602; G06F 21/64; H04N 19/115; H04N 19/147; H04N 19/463; H04N 21/23418; H04N 21/23439; H04N 21/2402
See application file for complete search history.

(56) References Cited

U.S. PATENT DOCUMENTS

| | | | |
|---|---|---|---|
| 9,762,385 B1 * | 9/2017 | Sun | G06F 21/64 |
| 10,735,739 B2 * | 8/2020 | Mao | H04N 19/463 |
| 2014/0258463 A1 * | 9/2014 | Winterrowd | H04L 65/4092 709/219 |
| 2016/0128043 A1 | 5/2016 | Shuman et al. | |
| 2017/0005705 A1 | 1/2017 | Casselman et al. | |
| 2019/0253477 A1 * | 8/2019 | Nolan | H04L 67/12 |

OTHER PUBLICATIONS

ISR and WO for Application No. PCT/US2021/014409, dated Apr. 26, 2021, 13 pages.

* cited by examiner

*Primary Examiner* — Kyung H Shin
(74) *Attorney, Agent, or Firm* — Seed IP Law Group LLP (57) ABSTRACT

The present disclosure is generally related to wireless data transmission. An example method for transmitting a data file from a base station to multiple Internet of Things (IoT) devices includes obtaining information on connections between the base station and IoT devices as well as device-to-device connections. The method also includes generating schemes for splitting the data file and transmitting each data portion accordingly. The method optionally includes obtaining updates on connection information and adjusting the data splitting schemes based thereon.

19 Claims, 4 Drawing Sheets

DISTRIBUTED DATA TRANSMISSION FOR INTERNET OF THINGS DEVICES

BACKGROUND

Technical Field

This application is directed to wireless data transmission and, in particular, data transmission between base stations and Internet of Things (IoT) devices.

Description of the Related Art

Internet of Things (IoT) communication has become increasingly prevalent in recent years. Existing IoT communication typically depends on present-day mobile networks. However, the massive growth of IoT data traffic means that the existing mobile communication systems (3G, 4G, 5G, etc.) may not be capable of coping with substantial future data traffic. IoT communication is typically based on narrowband applications, which may not be naturally suitable for transfer of data files larger in size. Transferring high volume data from base stations to a large number of connected IoT devices can cause congestion and clog up mobile networks.

BRIEF SUMMARY

In some embodiments, a computer-implemented method for transmitting a data file from a base station to multiple Internet of Things (IoT) devices includes obtaining first information regarding connections between the base station and a plurality of IoT devices, obtaining second information regarding device-to-device connections among one or more subsets of the plurality of IoT devices, and obtaining third information regarding computational capability of each of the IoT devices. The method also includes generating one or more schemes for splitting the data file for transmission based, at least in part, on the first, second, and third information and splitting the data file into data portions in accordance with the one or more schemes. The method further includes transmitting each data portion to at least one of the IoT devices based, at least in part, on the one or more schemes, obtaining updates on at least one of first, second, or third information, adjusting the one or more schemes based, at least in part, on the updates, and transmitting additional data portions in accordance with the adjusted one or more schemes.

In some embodiments, the first information indicates at least one of quality, reliability, or consistency of a connection between the base station and individual IoT devices. In some embodiments, the second information indicates at least one of quality, reliability, or consistency of one or more direct connections between individual IoT devices. In some embodiments, the connections between the base station and the plurality of IoT devices are part of a communication network distinct from the device-to-device connections among the one or more subsets of the plurality of IoT devices.

In some embodiments, generating the one or more schemes for splitting the data file for transmission comprises clustering the plurality of IoT devices into at least two groups. In some embodiments, generating the one or more schemes comprises generating a distinct scheme for each group. In some embodiments, at least one scheme indicates a quantity or size of data portions for splitting the data file. In some embodiments, the at least one scheme further associates each data portion with an identified IoT device for transmission thereto. In some embodiments, at least two schemes differ in the quantity or size of data portions that they indicate respectively. In some embodiments, the at least two schemes are applicable to different subsets of the plurality of IoT devices. In some embodiments, a non-transitory computer-readable medium stores contents that, when executed by one or more processors, cause the one or more processors to perform actions including generating one or more schemes for splitting a data file for transmission to a plurality of devices based, at least in part, on information regarding direct device-to-device connections between individual devices, and splitting the data file into data portions in accordance with the one or more schemes. The actions also include transmitting each data portion to at least one of the devices based, at least in part, on the one or more schemes, adjusting the one or more schemes based, at least in part, on updated information regarding the direct device-to-device connections, and transmitting additional data portions in accordance with the adjusted one or more schemes.

In some embodiments, the actions further include encrypting the data file before the splitting. In some embodiments, the data file includes software or firmware updates for the plurality of devices. In some embodiments, a particular one of the data portions includes the entire data file. In some embodiments, the particular one of the data portions is split by a device after being transmitted to the device.

In some embodiments, a system includes one or more processors and memory storing contents that, when executed by the one or more processors, cause the system to generate one or more schemes for splitting a data file for transmission to a plurality of devices based, at least in part, on information regarding direct device-to-device connections between individual devices, and split the data file into data portions in accordance with the one or more schemes. The contents also cause the system to transmit each data portion to at least one of the devices based, at least in part, on the one or more schemes, adjust the one or more schemes based, at least in part, on updated information regarding the direct device-to-device connections, and transmit additional data portions in accordance with the adjusted one or more schemes.

In some embodiments, each scheme for splitting the data file corresponds to a subgroup of the plurality of devices. In some embodiments, the contents further cause the system to divide the plurality of devices into subgroups based, at least in part, on the information regarding direct device-to-device connections between individual devices. In some embodiments, adjusting the one or more schemes includes adjusting at least one member of at least one of the subgroups. In some embodiments, generating one or more schemes for splitting the data file is further based on at least one of computational capacity, communication utilization, signal quality, signal reliability, or signal consistency associated with one or more devices of the plurality of devices.

DETAILED DESCRIPTION

Cellular mobile networks cover 90 percent of the world's population and typically allows an IoT device to be connected almost anywhere. However, IoT data traffic is usually dissimilar to regular mobile traffic such as conversational video or file transfer. IoT data can be small packets-based traffic involving a large number of IoT devices. IoT communication is typically based on narrowband applications, which may not be ideal for direct data transfer of sizable files between base stations and individual IoT devices. For example, the 3rd Generation Partnership Project (3GPP) standard, Long Term Evolution-Advanced (LTE-A) was developed for broadband applications. With narrowband applications, LTE-A is not capable of achieving efficiency in terms of bandwidth usage and cost. Direct connections of high bandwidth and/or high volume between a large number of IoT devices in a cell to a corresponding base station can cause considerable degradation of the overall network performance.

Instead of having each IoT device access the base station directly to achieve sizeable data download (e.g., for software or firmware updates of the IoT devices), embodiments of the present disclosure are directed to coordinated, distributed data transfer mechanisms that in part utilize device-to-device connections between IoT devices. Illustratively, when the mobile network is ready to download a data file to IoT devices, base station(s) can split the data file and transmit smaller data portions to selected IoT devices, which can further share and/or relay the data portions with peer IoT devices through IoT Small Cell Network and/or other mesh networks. Once an IoT device receives all requisite portions of the data file, it can reassemble them to reconstruct the data file locally. With the intelligent coordination and data distribution using direct device-to-device connections, bandwidth burden on the base station(s) can be greatly reduced. In this specification, embodiments of the present disclosure illustrate a mobile communication system with interactions between base station(s) and multiple IoT devices as an example. This detailed description is not meant to limit the disclosure to any specific embodiment. The present disclosure is equally applicable to vehicle-to-vehicle communication systems, smart home systems, cable television systems, broadcast television systems, Internet streaming media systems, or the like. While the disclosure shows and describes data file-related embodiments, it will be understood by those skilled in the art that various other changes in the form and details may be made therein without departing from the spirit and scope of the invention.

The disclosure uses the term "signal" in various places. One skilled in the art will recognize that the signal can be any digital or analog signal. Those signals can include, but are not limited to, a bit, a specified set of bits, an A/C signal, or a D/C signal. Uses of the term "signal" in the description can include any of these different interpretations. It will also be understood to one skilled in the art that the term "connected" is not limited to a physical connection (e.g., wired or wireless connection) but can refer to any means of communicatively or operatively coupling two devices.

In the figures, identical reference numbers identify similar features or elements. The sizes and relative positions of the features in the figures are not necessarily drawn to scale.

Figure 1:
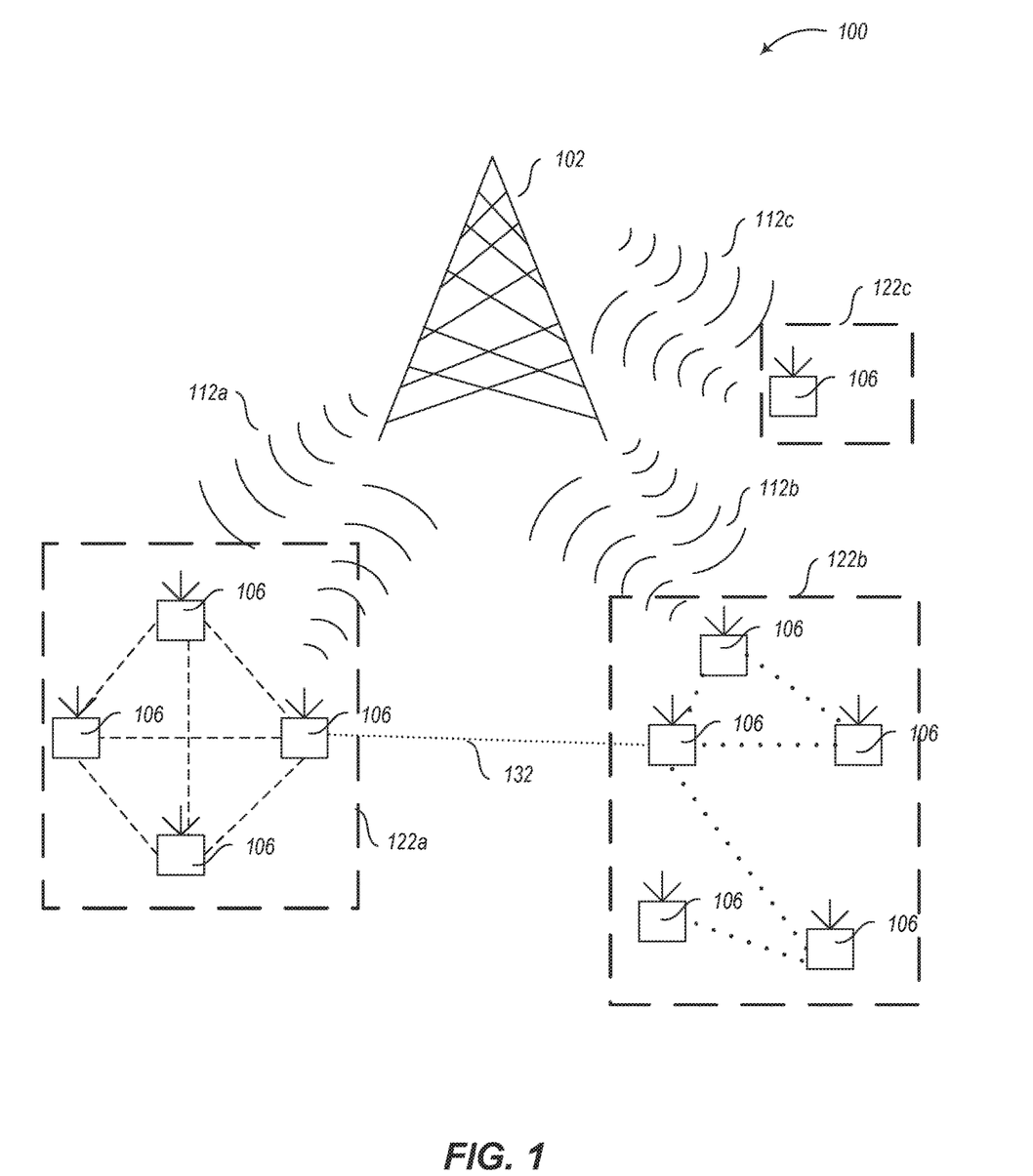
FIG. 1 illustrates an exemplary communication network, in accordance with some embodiments of the present disclosure.

Turning now to the drawings, FIG. 1 illustrates an exemplary communication network 100, in accordance with some embodiments of the present disclosure. Illustratively, the communication network 100 can be an LTE network, NR network, a mobile communication network based on other standard(s), combination of the same or the like. The communication network 100 includes one or more base stations (e.g., evolved Nodes B (eNodesB)) 102 and other network entities. The base station 102 communicates with one or more UEs (e.g., IoT devices) 106 via connections 112a~112c in accordance with applicable mobile communication protocols. The network protocols used for connections 112a~112c can be the same or different from one another.

Each base station 102 can provide communication coverage for a particular geographic area. The term "cell" may refer to a coverage area of a base station and/or a base station subsystem that serves this coverage area, depending on the context in which the term is used. A base station can support one or multiple (for example, three) cells. The communication network 100 can be a heterogeneous network that includes base stations of different types, for example, macro-eNodesB, peak-eNodesB, femto-eNodesB, repeaters, etc. These different types of base stations may have different levels of transmission power, different coverage areas, and a different impact on interference in the wireless network 100.

The UEs 106 can be scattered throughout the communication network 100 and each UE 106 can be fixed or mobile. A UE 106 can be an IoT device that has support for Internet connectivity and is capable of interacting with other devices over the Internet. IoT involves extending Internet connectivity beyond standard devices, such as desktops, laptops, smartphones and tablets, to any range of traditionally dumb or non-Internet-enabled physical devices and everyday objects. In some embodiments, IoT devices are part of a scenario in which every device communicates with other related devices in an environment to automate home and industry tasks, and to communicate usable sensor data to users, businesses and other interested parties.

As such, a UE 106 can be a cell phone, a personal digital assistant (PDA), a wireless modem, a wireless communication device, a portable device, a laptop, a wireless phone, a wireless local loop station (WLL), a tablet, a portable minicomputer, an intelligent book, a smart TV, a smart speaker, a smart toy, a smart wearable (e.g., smart watch), a smart appliance (e.g., smart refrigerator), a smart meter, a smart air conditioner, a smart thermostat, a smart lighting device, a smart fire alarm, a smart door lock, a smart bicycle, a medical sensor, a fitness tracker, a smart security system, a smart sensor, a smart vehicle, or the like.

A UE 106 can communicate with one or more other UEs 106 via connections that are based on protocols or technology different than connections 112a~112c. For example, IoT devices can communicate with one another via communications protocols such as CoAP, DTLS, and MQTT, among others; wireless protocols such as IPv6, LPWAN, Zigbee, Bluetooth Low Energy, Z-Wave, RFID, and NFC, among others; as well as various cellular, satellite, Wi-Fi, and/or Ethernet protocols.

In some embodiments, instead of transferring a data file from the base station to the UEs 106 via connections 112a~112c, the base station 102 obtains information regarding connections between the base station 102 and the UEs 106, device-to-device connections among one or more subsets of the UEs 106, and/or computational capability of individual UEs 106. Based on the obtained information, the base station 102 generates one or more schemes for splitting the data file and executes the file splitting accordingly.

For example, the base station 102 generates the scheme(s) by clustering or otherwise grouping the UEs 106 into subgroups 122a, 122b, and 122c. The grouping can be based on a lack of UE-to-UE connection (e.g., subgroup 122c), a below-threshold weak UE-to-UE connection (e.g., connection 132), and/or other factors relating to UE-to-UE connections.

Here, Subgroup 122c includes a single UE 106 that is not in direct device-to-device communication with any other UEs. In this case, a corresponding scheme indicates that a copy of the entire data file is to be transmitted to the single UE 106 via connection 112c.

Subgroup 122a includes 4 UEs 106 that are fully connected to one another via direct device-to-device connections. In this case, a corresponding scheme indicates that a copy of the data file be split into 4 data portions and each data portion be transmitted to a different UE of subgroup 122a via connection 112a. The 4 UEs can quickly share the data portions among themselves, reassemble and reconstruct the data file locally on each UE.

Subgroup 122b includes 5 UEs 106 that are connected to one another directly or indirectly. In this case, a corresponding scheme can indicate that a copy of the entire data file be transmitted to a UE having sufficient (e.g., above a threshold) computational power to split the data file and share data portions within the subgroup, so that the file can be reconstructed by each UE of the subgroup.

As the mobile connections between individual UEs and the base station, direct connections between UEs themselves, and/or computational capability of individual UEs 106 change over time (e.g., due to motion, application execution, and/or environmental factors), the base station can obtain correspondingly updated information and adjust the data file splitting scheme(s) based thereon. Illustratively, the grouping of UEs can be updated to add or remove member(s) from subgroups, subgroup(s) can be created or terminated, the data file can be split in different or supplemental manner(s), or the like. The base station can transmit additional data portions to selected UEs 106 in accordance with the adjusted data file splitting scheme(s).

Figure 2:
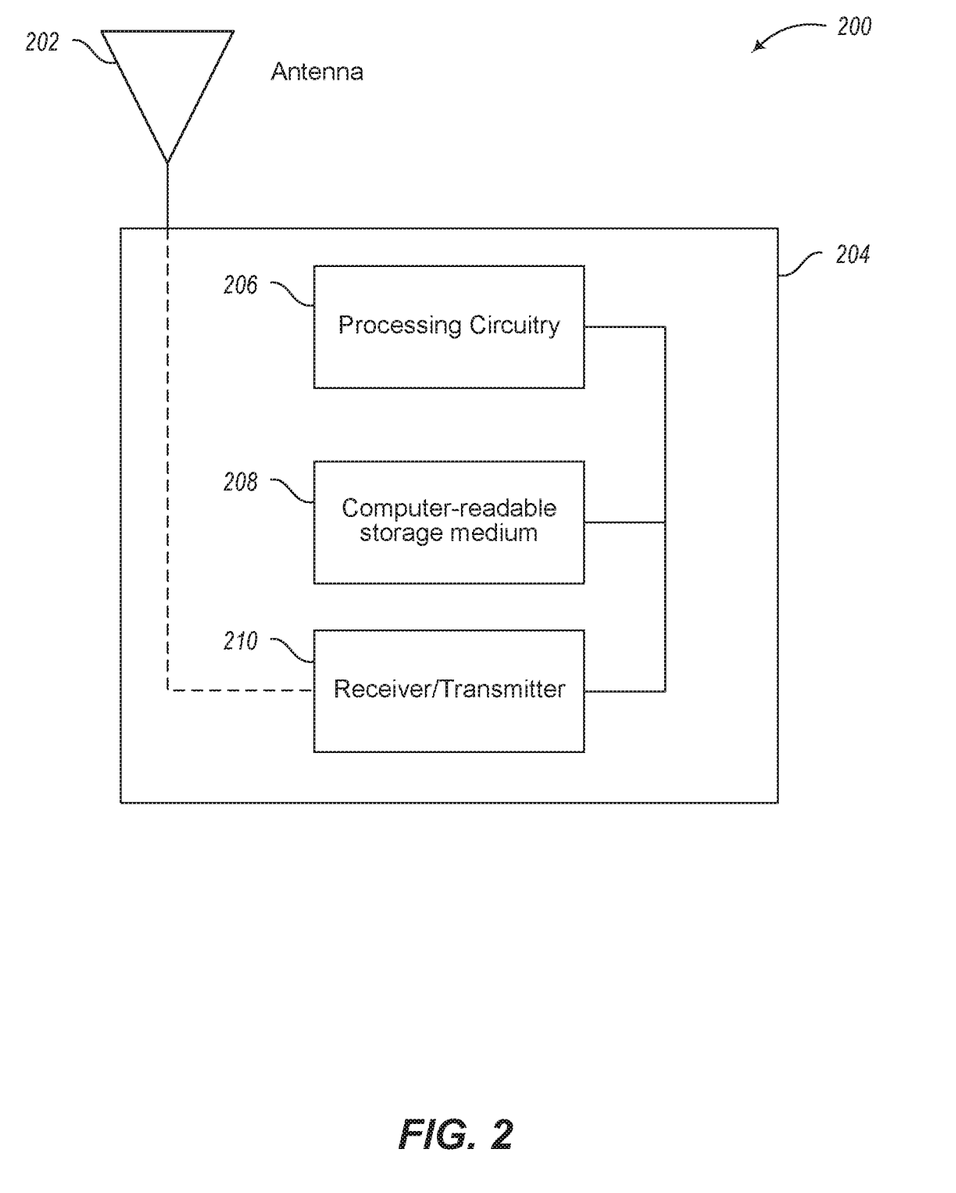
FIG. 2 illustrates at least a portion of an exemplary wireless device, in accordance with some embodiments of the present disclosure.

FIG. 2 illustrates at least a portion of an exemplary wireless device 200, in accordance with some embodiments of the present disclosure. Illustratively, the wireless device 200 can be a base station, a UE, or a part thereof. The wireless device 200 includes an antenna 202, and a housing 204 that houses a processing circuitry 206 (e.g., including one or more central processing units (CPUs), microprocessors, application-specific integrated circuits (ASICs), and/or field-programmable gate arrays (FPGAs)), a computer-readable storage medium 208 (e.g., including one or more memory devices), and a receiver/transmitter or transceiver 210. The antenna 202 can include one or more antennas or an array of antennas, and is configured to send and/or receive wireless signals, and is connected to the receiver/transmitter 210. The antenna 202 may or may not reside within a device housing 204. In some alternative embodiments, the wireless device 200 may not include an antenna 202, and the antenna 202 may instead be separate from the wireless device 200 and connected to the wireless device 200 via an interface or port.

In various embodiments, some or all of the functionality described herein can be embodied in the wireless device 200 or, alternatively, can be implemented by the processing circuitry 206 executing instructions stored on the computer-readable storage medium 208. In alternative embodiments, some or all of the functionality may be provided schema without performing the processing instructions stored on a computer readable storage medium, such as through a circuit realization. In any of these specific embodiments, whether or not executing instructions stored on a computer-readable storage medium, it can be said that the processing circuitry 206 is configured to perform the required functionality. The benefits provided by such functionality are not limited to the processing circuitry 206 alone or to other components of the wireless device, but are used by the wireless device 200 as a whole, and/or by users and the wireless network in general.

The processing circuitry 206 can be configured to perform any of the identification, determination, grouping, splitting, generation, adjusting, and/or other applicable operations described herein. The operations as being performed by the processing circuitry 206 may include processing information obtained by the processing circuitry 206 by, for example, converting the received information to other information, comparing the obtained information or the converted information with information stored in the wireless device 200, and/or performing one or more operations based on the information received or the converted information, and as a result of the processing.

The antenna 202, the receiver/transmitter 210, and/or the processing circuitry 206 can be configured to perform any transmission operations described herein. Any information, data, and/or signals may be transmitted to network equipment and/or another wireless device. Similarly, the antenna 202, the receiver/transmitter 210, and/or the processing circuitry 206 can be configured to perform any receiving operations described herein. Any information, data, and/or signals may be received from network equipment and/or another wireless device.

The computer-readable storage medium 208 generally operates to store instructions, such as a computer program, software, or application, including one or more of logic, rules, code, tables, and/or other instructions operable by the processing circuitry 206. Examples of computer-readable storage media 208 include computer memory (e.g., Random Access Memory (RAM) or Read Only Memory (ROM)), high-capacity storage media (e.g., hard disk), removable storage media (e.g., Compact A disc (CD) or Digital Video Disc (DVD)), and/or any other volatile or non-volatile, non-temporary computer-readable and/or computer-executable memory devices that store information, data, and/or instructions that may be used by the processing circuitry 206. In some embodiments, the processing circuitry 206 and the computer-readable storage medium 208 may be considered integrated.

Alternative embodiments of the wireless device 200 may include additional components besides those shown in FIG. 2, which may be responsible for providing some aspects of the functionality of the wireless device 200, including any of the functionality described herein and/or any functionality necessary to support the solution described above. For example, the wireless device 200 may include interfaces, devices and input circuits, and interfaces, devices and output circuits. Interfaces, devices, and input circuits may include a microphone, proximity sensor, or another, keys/buttons, a touch screen, one or more cameras, a USB port, or other input elements. Interfaces, devices, and output circuits may include loudspeaker, display, vibration pattern, USB port, headphone interface, or other output elements. Using one or more of the interfaces, devices, and input and output circuits, the wireless device 200 can communicate with end users and/or the wireless or other communication network(s), and allow them to benefit from the functionality described herein.

Wireless device 200 may also include several sets of processing circuitry 206, computer-readable storage medium 208, receiver/transmitter 210, and/or antenna 202 for various wireless or other communication technologies integrated into the wireless device 200, such as, for example, GSM, WCDMA, LTE, NR, WiFi, Bluetooth, CoAP, DTLS, MQTT, IPv6, LPWAN, Zigbee, Bluetooth Low Energy, Z-Wave, RFID, and/or NFC technology. These technologies may be integrated into the same or different chipsets and other components within the wireless device 200.

Figure 3:
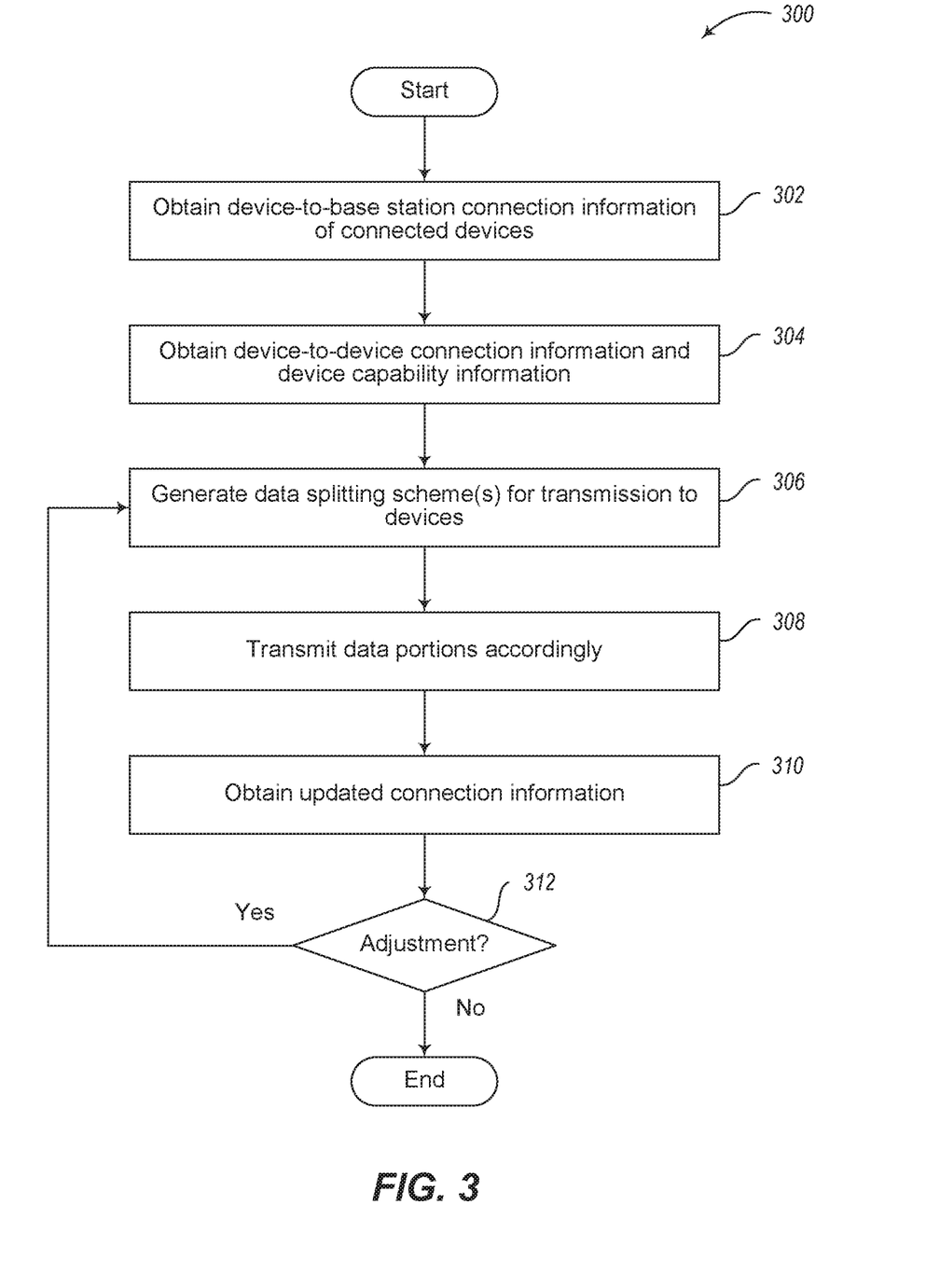
FIG. 3 shows a flow diagram of an exemplary method implemented by a wireless device (e.g., a base station) for distributed data transmission, in accordance with some embodiments of the present disclosure.

FIG. 3 shows a flow diagram of an exemplary method 300 implemented by a wireless device (e.g., a base station) for distributed data transmission, in accordance with some embodiments of the present disclosure.

With reference to FIG. 3, at block 302, the method 300 includes obtaining information regarding connections between the base station and multiple UEs. Illustratively, the base station can identify all or some qualified UEs (e.g., IoT devices) connected to the base station and determine at least one of quality, reliability, or consistency of respective connections between individual UEs and the base station.

At block 304, the method 300 includes obtaining information regarding device-to-device connections between the UEs as well as the computational capability of individual UEs. Illustratively, the information can indicate at least one of quality, reliability, or consistency of one or more direct connections between UEs, individual UE's computational resources, configuration, utilization, prioritization, restrictions, or the like. The base station can query each UE identified at block 302 to obtain such information; alternatively or in addition, a UE can transmit at least a portion of the information to the base station without request. In some embodiments, the base station can infer or predict at least some part of the information based on signal(s) received from individual UEs. As previously described, the connections between the base station and the UEs can be part of a communication network distinct (e.g., in terms of communications protocol, wireless band usage, and/or other communication technology) from the device-to-device connections among one or more subsets of the UEs themselves.

At block 306, the method 300 includes generating one or more schemes for splitting a data file for transmission. In some embodiments, the data file includes software or firmware update(s) for multiple UEs. Illustratively, the base station can cluster or otherwise group UEs into subgroups based on the information obtained at block 302 and/or block 304. The subgroups of UEs may or may not overlap with one another (e.g., whether there are common member(s) between or among subgroups). Various applicable clustering or grouping methods (e.g., k-means clustering, mean-shift clustering, hierarchical clustering, density-based spatial clustering, expectation-maximization clustering, or the like) can be used by the base station to achieve the grouping.

The base station can generate a distinct scheme for each subgroup, and the scheme can indicate a quantity, size, and/or proportional ratio of data portions for splitting the data file. In some embodiments, the scheme associates each data portion with an identified UE in the subgroup for transmission of the data portion thereto. The schemes generated for each subgroup can be the same or different in the quantity, size, and/or proportional ratio of data portions that they each indicate. In some embodiments, a scheme can indicate that no splitting is to be performed and a copy of the entire data file is to be transmitted. In some embodiments, a scheme can indicate multiple ways to split the data file and the resulting data portions may or may not overlap with one another in content.

At block 308, the method 300 includes transmitting data portions in accordance with the generated schemes. The base station can split copies of the data file into data portions and transmit each data portion to at least one UE in accordance with the generated scheme(s). In some embodiments, the base station encrypts or otherwise secures copies of the data file and/or data portions (e.g., with digital signature(s)) before data transmission.

At block 310, the method 300 includes obtaining updates on the information previously obtained at block 302 and/or block 304. This can be achieved by the base station actively querying connected UE(s), by the UE(s) sending update(s) to the base station periodically or when triggered by a status change of the UE, and/or by the base station's own computation and/or prediction in accordance with signal(s) received from the UE(s).

At block 312, the method 300 includes determining whether the data file scheme(s), related file splitting and/or data transmission should be adjusted, based on the updates obtained at block 310. Illustratively, the clustering or grouping of UEs may need to be adjusted so that certain subgroup(s) is terminated, created, merged, split, or otherwise changed (e.g., by adding or removing one or more members). Consequently, the quantity, size, and/or proportional ratio of data portions for splitting the data file as indicated by the corresponding scheme(s) may need to be adjusted to ensure some level of data redundancy and/or robustness of the distributed transmission. If the base station determines that adjustment is needed, the method 300 proceeds to block 306 to implement the adjustments by updating existing scheme(s) or creating new scheme(s). Otherwise, the method 300 ends.

Figure 4:
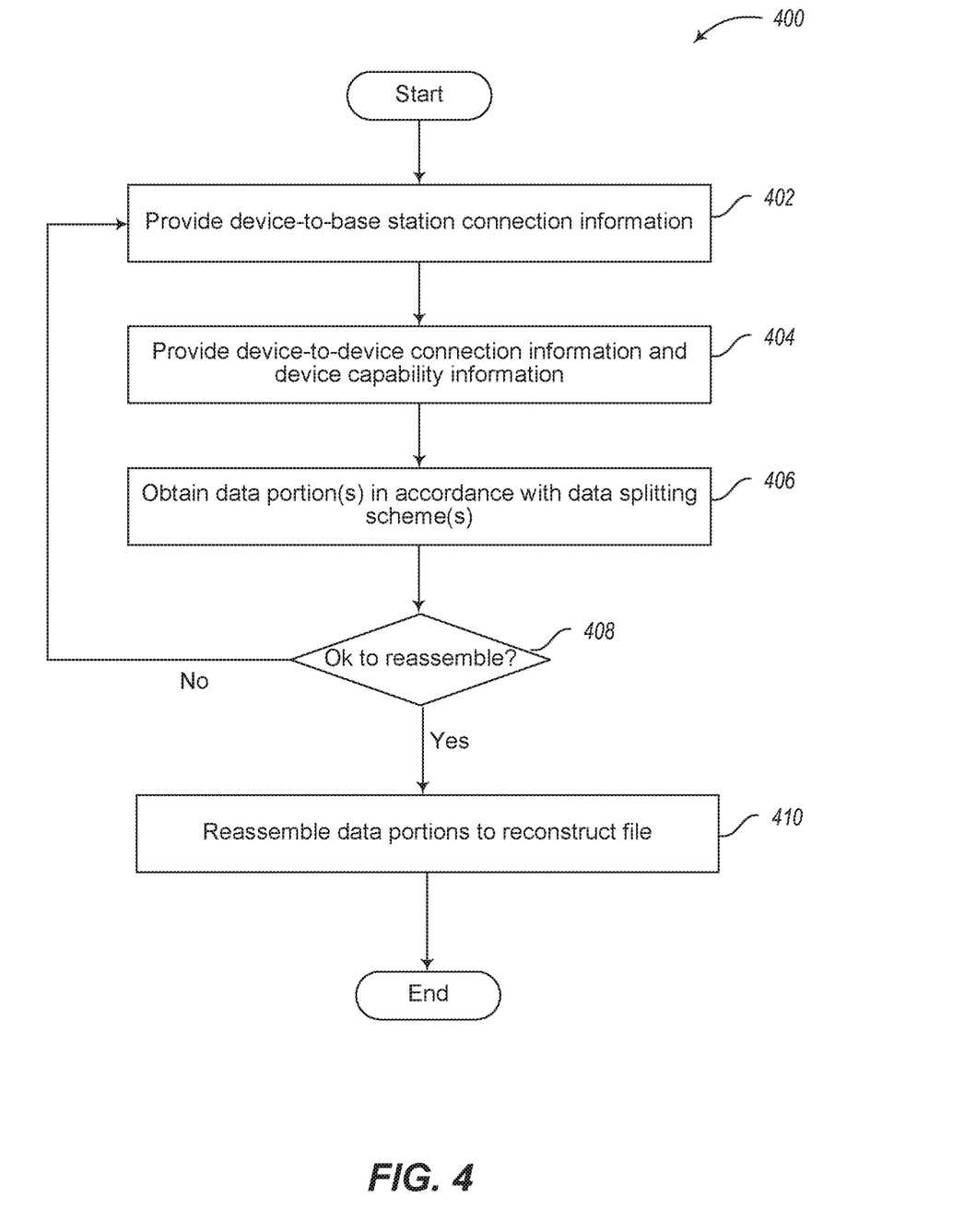
FIG. 4 shows a flow diagram of an exemplary method implemented by a wireless device (e.g., a User Equipment (UE)) for distributed data reception, in accordance with some embodiments of the present disclosure.

FIG. 4 shows a flow diagram of an exemplary method 400 implemented by a wireless device (e.g., a UE such as an IoT device) for distributed data reception, in accordance with some embodiments of the present disclosure.

With reference to FIG. 4, at block 402, the method 400 includes providing information regarding connections between a base station and the UE. Illustratively, the information includes at least one of quality, reliability, or consistency of the connection between the UE and the base station. The information can be provided explicitly from the UE to the base station in one or more messages; alternatively or in addition, the information can be provided as inherent information that can be derived by the base station based on signal(s) transmitted from the UE.

At block 404, the method 400 includes providing information regarding device-to-device connections between the UE and one or more other UEs as well as the computational capability of the UE. Illustratively, the information can indicate at least one of quality, reliability, or consistency of one or more direct connections between the UE and other UE(s), the UE's computational resources, configuration, utilization, prioritization, restrictions, or the like. The information can be provided in response to a query from the base station; alternatively or in addition, a UE can transmit the information without a request from the base station (e.g., periodically). In some embodiments, the base station can infer or predict at least some part of the information based on signal(s) received from individual UEs. As previously described, the connections between the base station and the UEs can be part of a communication network distinct (e.g., in terms of communication protocol, wireless band usage, and/or other communication technology) from the device-to-device connections among one or more subsets of the UEs themselves.

At block 406, the method 400 includes receiving one or more data portions in accordance with corresponding data splitting scheme(s). As previously described, the scheme(s) can be generated by the base station, and in some cases, by another UE with sufficient level of computational capacity. The UE can receive the data portion(s) from the base station directly and/or from other UE(s). In some embodiments, the UE receives at least some portion of the corresponding data splitting scheme(s) as well, so that the UE can further split or merge the received data portion(s), request data portion(s) from other UE(s) or from the base station, share data portion(s) with other UE(s), generate additional data transmission mechanism(s), and/or revise existing mechanism(s) for distributed transmission of at least a portion of the data file.

At block 408, the method 400 includes determining whether the UE has sufficient data portion(s) for reassembling to reconstruct the data file. In some embodiments, the UE decrypts or otherwise verifies the authenticity of received data portion(s) before making the determination. If the UE determines that it does not have sufficient data portion(s), the method 400 proceeds to blocks 402 and 404 where the method 400 includes providing updated information regarding connections and computational capacity.

If the UE determines that it has sufficient data portion(s), the method 400 proceeds to block 410, where the method 400 includes reassembling the data portion(s) to reconstruct the data file. The reassembling can be performed locally by the UE; alternatively, some portion of the reassembling can be performed by another entity (e.g., a device associated with the UE or other UE(s)). When the reassembling and file reconstruction is complete, the method 400 ends.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for transmitting a data file from a base station to multiple Internet of Things (IoT) devices, comprising:
obtaining first information regarding connections between the base station and a plurality of IoT devices;
obtaining second information regarding device-to-device connections among one or more subsets of the plurality of IoT devices;
obtaining third information regarding computational capability of each of the IoT devices;
generating one or more schemes for splitting the data file for transmission based, at least in part, on (a) the first, second, and third information and (b) clustering the plurality of IoT devices into at least two groups;
splitting the data file into data portions in accordance with the one or more schemes;
transmitting each data portion to at least one of the IoT devices based, at least in part, on the one or more schemes;
obtaining updates on at least one of the first, second, or third information;
adjusting the one or more schemes based, at least in part, on the updates; and
transmitting additional data portions in accordance with the adjusted one or more schemes.

2. The method of claim 1, wherein the first information indicates at least one of quality, reliability, or consistency of a connection between the base station and individual IoT devices.

3. The method of claim 1, wherein the second information indicates at least one of quality, reliability, or consistency of one or more direct connections between individual IoT devices.

4. The method of claim 1, wherein the connections between the base station and the plurality of IoT devices are part of a communication network distinct from the device-to-device connections among the one or more subsets of the plurality of IoT devices.

5. The method of claim 1, wherein generating the one or more schemes comprises generating a distinct scheme for each group.

6. The method of claim 1, wherein at least one scheme indicates a quantity or size of data portions for splitting the data file.

7. The method of claim 6, wherein the at least one scheme further associates each data portion with an identified IoT device for transmission thereto.

8. The method of claim 6, wherein at least two schemes differ in the quantity or size of data portions that they indicate respectively.

9. The method of claim 8, wherein the at least two schemes are applicable to different subsets of the plurality of IoT devices.

10. A non-transitory computer-readable medium storing contents that, when executed by one or more processors, cause the one or more processors to perform actions comprising:
generating one or more schemes for splitting a data file for transmission to a plurality of devices based, at least in part, on (a) information regarding direct device-to-device connections between individual devices and (b) clustering the plurality of devices into at least two groups;
splitting the data file into data portions in accordance with the one or more schemes;
transmitting each data portion to at least one of the devices based, at least in part, on the one or more schemes;
adjusting the one or more schemes based, at least in part, on updated information regarding the direct device-to-device connections; and
transmitting additional data portions in accordance with the adjusted one or more schemes.

11. The computer-readable medium of claim 10, wherein the actions further comprise encrypting the data file before the splitting.

12. The computer-readable medium of claim 10, wherein the data file includes software or firmware updates for the plurality of devices.

13. The computer-readable medium of claim 10, wherein a particular one of the data portions includes the entire data file.

14. The computer-readable medium of claim 13, wherein the particular one of the data portions is split by a device after being transmitted to the device.

15. A system, comprising:
one or more processors; and
memory storing contents that, when executed by the one or more processors, cause the system to:
generate one or more schemes for splitting a data file for transmission to a plurality of devices based, at least in part, on (a) information regarding direct device-to-device connections between individual devices and (b) dividing the plurality of devices into subgroups;
split the data file into data portions in accordance with the one or more schemes;
transmit each data portion to at least one of the devices based, at least in part, on the one or more schemes;
adjust the one or more schemes based, at least in part, on updated information regarding the direct device-to-device connections; and
transmit additional data portions in accordance with the adjusted one or more schemes.

16. The system of claim 15, wherein each scheme for splitting the data file corresponds to a subgroup of the plurality of devices.

17. The system of claim 15, wherein the contents, when executed by the one or more processors, further cause the system to divide the plurality of devices into the subgroups based, at least in part, on the information regarding direct device-to-device connections between individual devices.

18. The system of claim 17, wherein adjusting the one or more schemes includes adjusting at least one member of at least one of the subgroups.

19. The system of claim 15, wherein generating one or more schemes for splitting the data file is further based on at least one of computational capacity, communication utilization, signal quality, signal reliability, or signal consistency associated with one or more devices of the plurality of devices.

* * * * *